(12) United States Patent
Toksvig et al.

(10) Patent No.: US 7,737,988 B1
(45) Date of Patent: Jun. 15, 2010

(54) USING FONT FILTERING ENGINES FOR TEXTURE BLITTING

(75) Inventors: Michael J. M. Toksvig, Palo Alto, CA (US); Alexander L. Minkin, Palo Alto, CA (US); Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 569 days.

(21) Appl. No.: 11/273,767

(22) Filed: Nov. 14, 2005

(51) Int. Cl.
*G09G 5/00* (2006.01)

(52) U.S. Cl. .................................. 345/582; 345/470

(58) Field of Classification Search .................. 345/582
See application file for complete search history.

(56) References Cited

U.S. PATENT DOCUMENTS

| | | | | |
|---|---|---|---|---|
| 5,739,870 | A * | 4/1998 | Simpson | 348/628 |
| 6,005,582 | A * | 12/1999 | Gabriel et al. | 345/586 |
| 6,046,747 | A * | 4/2000 | Saunders et al. | 345/582 |
| 6,097,397 | A * | 8/2000 | Lee | 345/586 |
| 6,292,193 | B1 * | 9/2001 | Perry et al. | 345/582 |
| 6,373,495 | B1 * | 4/2002 | Lin et al. | 345/582 |
| 6,377,261 | B1 * | 4/2002 | Fernandez et al. | 345/467 |
| 6,504,545 | B1 * | 1/2003 | Browne et al. | 345/473 |
| 6,664,971 | B1 * | 12/2003 | Mukherjee et al. | 345/582 |
| 6,717,578 | B1 * | 4/2004 | Deering | 345/428 |
| 6,885,378 | B1 * | 4/2005 | Tsai et al. | 345/557 |
| 6,967,659 | B1 * | 11/2005 | Jayavant et al. | 345/506 |
| 6,967,689 | B1 * | 11/2005 | Chu | 348/569 |
| 7,012,619 | B2 * | 3/2006 | Iwata et al. | 345/613 |
| 7,158,143 | B2 * | 1/2007 | Prokopenko et al. | 345/586 |
| 7,170,528 | B1 * | 1/2007 | Chater et al. | 345/587 |
| 7,221,372 | B2 * | 5/2007 | Haaker et al. | 345/582 |
| 2004/0085322 | A1 * | 5/2004 | Alcorn et al. | 345/562 |
| 2004/0102245 | A1 * | 5/2004 | Escalera et al. | 463/32 |
| 2005/0007379 | A1 * | 1/2005 | Vijayakumar et al. | 345/582 |
| 2005/0007380 | A1 * | 1/2005 | Haaker et al. | 345/582 |
| 2007/0080972 | A1 * | 4/2007 | Gruber | 345/582 |

* cited by examiner

*Primary Examiner*—Xiao M Wu
*Assistant Examiner*—Maurice McDowell, Jr.
(74) *Attorney, Agent, or Firm*—Patterson & Sheridan, LLP

(57) ABSTRACT

Systems and methods used for font filtering may also be used to perform texture blits. Texture data is read in blocks that are coarsely aligned. Font engines may be used to align the texture data as specified by a copy (blit) instruction to provide a finely aligned region of the texture data within a font filter footprint. The finely aligned region is then bilinearly filtered using a "nearest" mode to provide the bit aligned region of the texture map specified by the copy instruction.

20 Claims, 7 Drawing Sheets

USING FONT FILTERING ENGINES FOR TEXTURE BLITTING

BACKGROUND OF THE INVENTION

1. Field of the Invention

Embodiments of the present invention generally relate to copying bit aligned texture data and, more specifically, to using font processing engines to read and align the texture data to perform a blit operation.

2. Description of the Related Art

Conventional systems for performing font filtering are configured to filter a region of a bitmap and produce a coverage value. In those conventional systems texture blit operations are typically performed by a graphics engine configured to process two-dimensional data.

Accordingly, it is desirable to reuse font filtering engines to perform bitmap blit operations in order to conserve die area.

SUMMARY OF THE INVENTION

The current invention involves new systems and methods for using engines for font filtering to perform texture blits. Texture data is read in blocks that are coarsely aligned. Font filtering engines may be used to align the texture data as specified by a copy (blit) instruction to provide a finely aligned region of the texture data within a font filter footprint. The finely aligned region is then bilinearly filtered using a "nearest" mode to provide the bit aligned region of the texture map specified by the copy instruction. Using the font filtering engines to perform texture copies reduces the need for having a specific engine to perform the copy, possibly saving die area in a graphics system.

Various embodiments of a method of the invention for copying a bit aligned region of a texture map includes reading a coarsely aligned region of the texture map, aligning the coarsely aligned region of the texture map in a horizontal direction to match a width of a font filter footprint and produce a horizontally aligned region of the texture map, aligning the horizontally aligned region of the texture map in a vertical direction to match a height of the font filter footprint and produce a finely aligned region of the texture map, and filtering the finely aligned region of the texture map using a bilinear interpolation engine configured in a nearest texel sampling mode to produce the bit aligned region of the texture map specified by a copy instruction.

Various embodiments of the invention include a system for copying a bit aligned region of a texture map including a texture read request unit, a first font processing engine, a second font processing engine, and a bilinear interpolation engine. The texture read request unit is configured to read a coarsely aligned region of the texture map. The first font processing engine is configured to align the coarsely aligned region of the texture map in a horizontal direction to match a width of a font filter footprint and produce a horizontally aligned region of the texture map. The second font processing engine is configured to align the horizontally aligned region of the texture map in a vertical direction to match a height of the font filter footprint and produce a finely aligned region of the texture map. The bilinear interpolation engine is configured to filter the finely aligned region of the texture map using a nearest texel sampling mode to produce the bit aligned region of the texture map specified by a copy instruction.

Various embodiments of the invention include a programmable graphics processor for copying bit aligned texture regions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
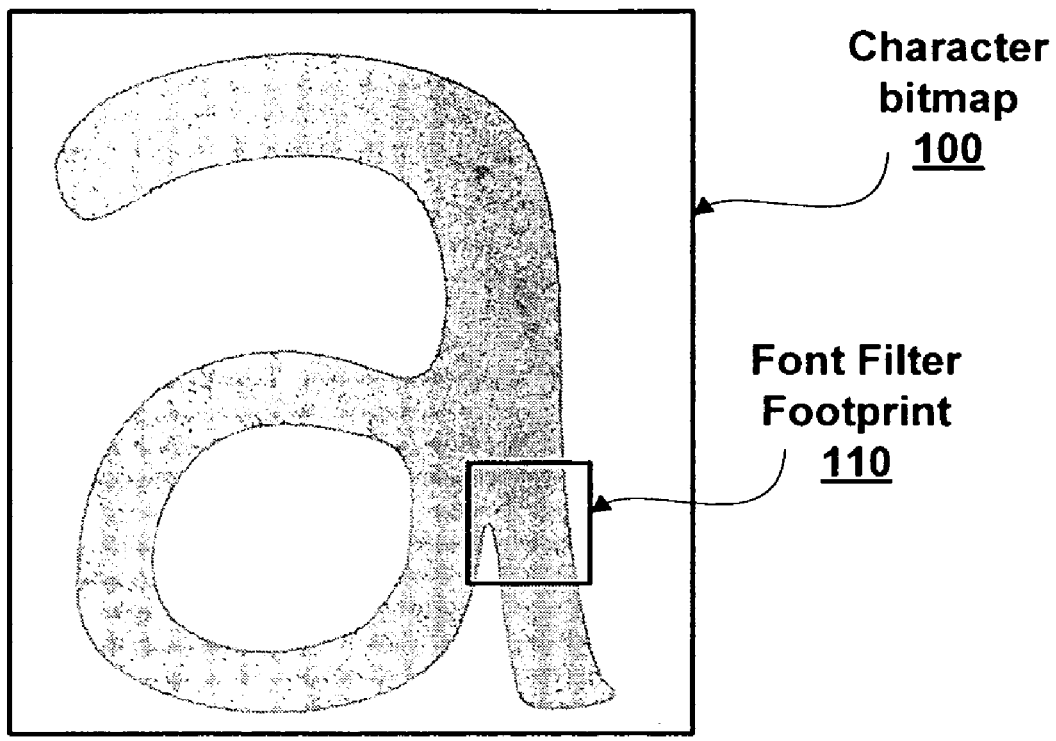
FIG. 1A illustrates a character bitmap and a font filter footprint in accordance with one or more aspects of the present invention.

FIG. 1A illustrates a character bitmap 100 and a font filter footprint 110 in accordance with one or more aspects of the present invention. Font filter footprint 110 is used to extract specific texels from character bitmap 100 and filter those texels to produce a coverage value. The coverage value indicates the percentage of texels within font filter footprint 110 that are also within the character represented by character bitmap 100, i.e. the shaded texels of character bitmap 100. Although font filter footprint 110 is shown as a square, font filter footprints of other shapes, including rectangles, may also be used to extract texels from character bitmaps.

Figure 1B:
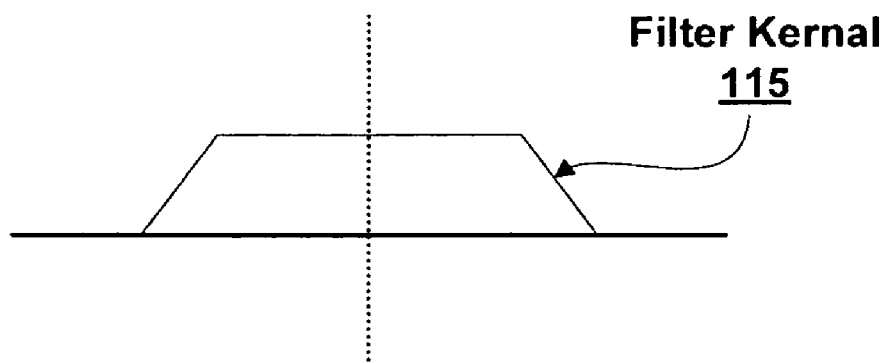
FIG. 1B illustrates a representative filter kernel for the font filter in accordance with one or more aspects of the present invention.

FIG. 1B illustrates a representative filter kernel, filter kernel 114, for font filter footprint 110 in accordance with one or more aspects of the present invention. Filter kernel 114 may be applied to the texels within font filter footprint 110 to produce a filtered font texel. In some embodiments of the present invention font filter footprint 110 is 9×9 texels and filter kernel 114 is also 9×9 texels. Like font filter footprint 110, the shape of filter kernel 114 is not limited to a square. In other embodiments of the present invention, the dimensions of filter kernel 114 do not match the dimensions of font filter footprint 110.

Figure 1C:
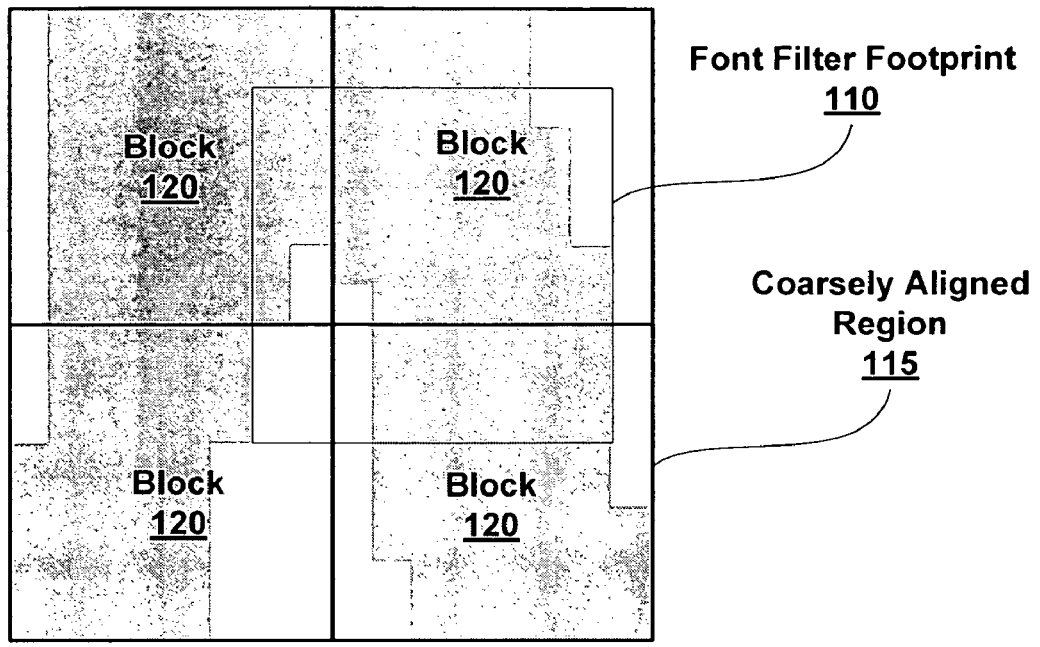
FIG. 1C illustrates the font filter footprint applied to the character bitmap in accordance with one or more aspects of the present invention.

FIG. 1C illustrates font filter footprint 110 applied to character bitmap 100 in accordance with one or more aspects of the present invention. Each block 120 of character bitmap 100 includes the same number of texels. For example, each block 120 may be 8×8 and include 64 bits, representing 64 texels of a one bit per texel bitmap. Font filter footprint 110 is 9×9 texels and therefore, four blocks 120 are needed to include all of the texels within font filter footprint 110. Therefore, texture data is read from character bitmap 100 in groups of four blocks 120 that are coarsely aligned on a block 120 boundary, forming coarsely aligned region 115. For example, 64×64 texels within coarsely aligned region 115 are read from a texture map and the 64×64 texels are coarsely aligned on an 8×8 texel boundary when block 120 is 8×8 texels. The group of four blocks 120 that form coarsely aligned region 115 may be aligned on any block 120 boundary. In contrast, font filter footprint 110 is aligned on a texel boundary within coarsely aligned region 115.

Figure 1D:
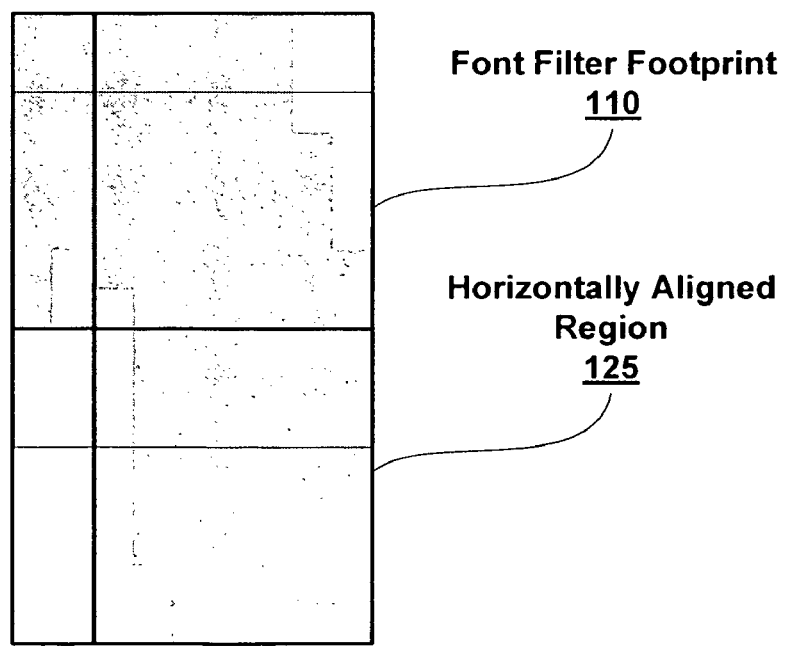
FIG. 1D illustrates a representative horizontally aligned region including the font filter footprint in accordance with one or more aspects of the present invention.

FIG. 1D illustrates a representative horizontally aligned region, horizontally aligned region 125, including font filter footprint 110 in accordance with one or more aspects of the present invention. In order to extract the texels within font filter footprint 110 a width of coarsely aligned region 115 is reduced to match a width of font filter footprint 110, forming horizontally aligned region 125. In other embodiments of the present invention, a vertically aligned region may be formed by reducing a height of coarsely aligned region 115 to match a height of font filter footprint 110. Horizontally aligned region 125 is aligned on a block 120 boundary in the vertical direction and a bit boundary in the horizontal direction. Similarly a vertically aligned region is aligned on a block 120 boundary in the horizontal direction and a bit boundary in the vertical direction.

Figure 1E:
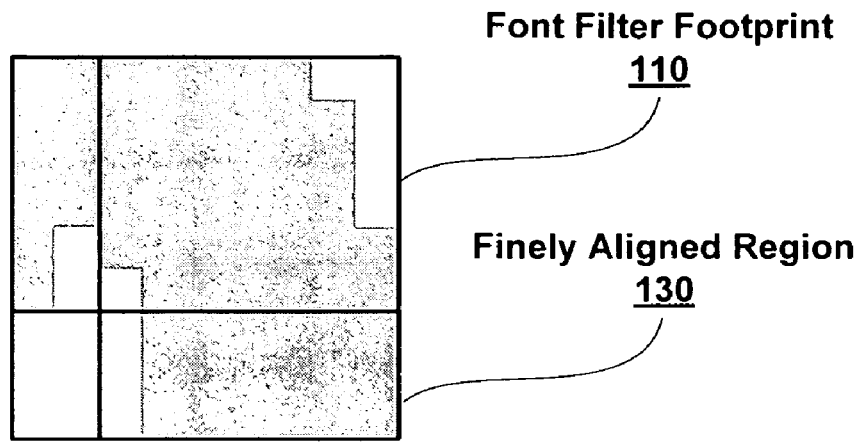
FIG. 1E illustrates a representative finely aligned region including the font filter footprint in accordance with one or more aspects of the present invention.

FIG. 1E illustrates a representative finely aligned region, finely aligned region 130, including font filter footprint 110 in accordance with one or more aspects of the present invention. In order to extract the texels within font filter footprint 110 a height of horizontally aligned region 125 is reduced to match a height of font filter footprint 110, forming finely aligned region 130 that is aligned on a bit boundary in the horizontal and in the vertical directions. Finely aligned region 130 is coincident with font filter footprint 110. Similarly, a width of a vertically aligned region may be reduced to match a width of font filter footprint 110 to form finely aligned region 130 that is aligned on a bit boundary in the horizontal and in the vertical directions.

Figure 1F:
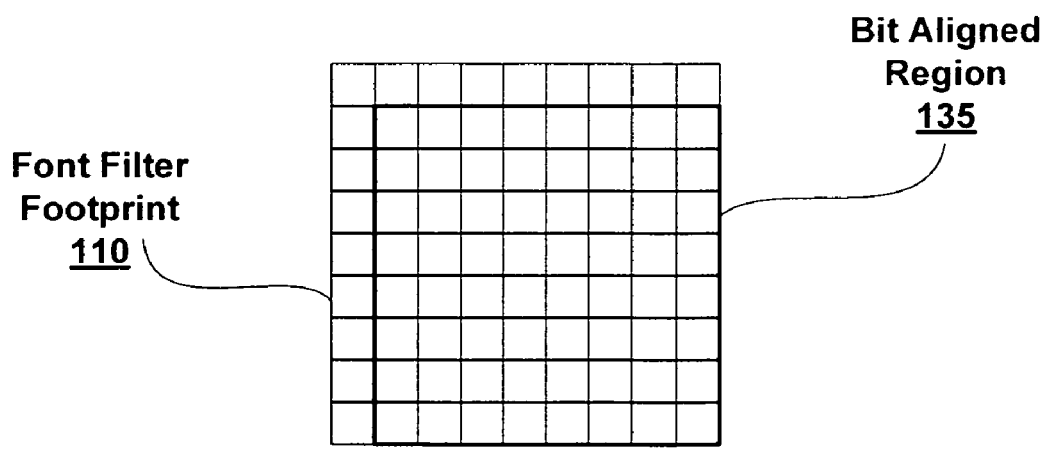
FIG. 1F illustrates a representative bit aligned region in accordance with one or more aspects of the present invention.

FIG. 1F illustrates a representative bit aligned region, bit aligned region 135, in accordance with one or more aspects of the present invention. Like finely aligned region 130, bit aligned region 135 is also aligned on a bit boundary in the horizontal and in the vertical directions. Bit aligned region 135 may be a subset of texels within font filter footprint 110. Finely aligned region 130 may be used as a bit aligned region when all of the texels within font filter footprint 110 are needed. For example, when font filtering is performed and the dimensions of filter kernel 114 match the dimensions of font filter footprint 110.

Bit aligned region 135 is sized according to a copy instruction (texure blit) and is independent of the dimensions of font filter footprint 110. For example, as shown in FIG. 1F, font filter footprint 110 is 9×9 bits and bit aligned region 135 is 8×8 bits. Therefore, some of the texels within font filter footprint 110 are discarded to form bit aligned region 135 and execute the copy instruction. In another embodiment of the present invention, font filter footprint 110 is 5×5 bits, block 120 is 4×4 bits, coarsely aligned region 115 is 8×8 bits, and bit aligned region 135 is 4×4 bits.

Figure 2A:
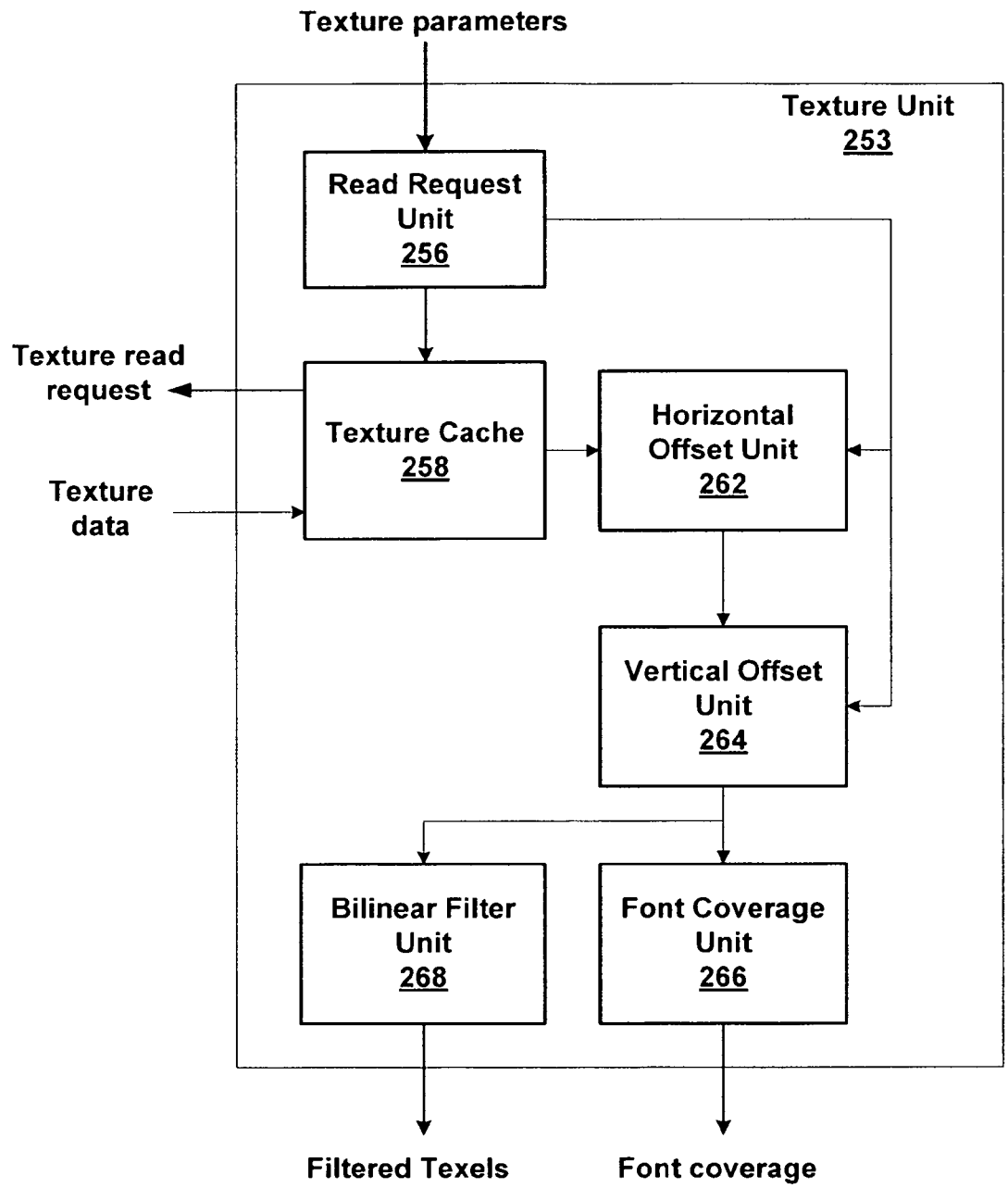
FIG. 2A is an exemplary block diagram of a texture unit including font filtering engines in accordance with one or more aspects of the present invention.

FIG. 2A is an exemplary block diagram of a texture unit, texture unit 253, including font processing engines in accordance with one or more aspects of the present invention. Texture unit 253 includes font processing engines horizontal offset unit 262, vertical offset unit 264, and font filter unit 266. Texture unit 253 also includes a read request unit 256, texture cache 258, and bilinear filter unit 268 for performing conventional texture mapping operations. Additional processing units may be included within texture unit 253 to perform other functions, e.g., level of detail computations, texture address computations, trilinear filtering, anisotropic filtering, and the like. Some of the font processing engines may be used in conjunction with read request unit 256 and bilinear filter unit 268 to perform texture copy operations. Therefore, die area is conserved while providing additional functionality.

Read request unit 256 receives texture parameters, e.g., texture identifier and texture map coordinates, and generates a read request corresponding to a coarsely aligned region of a texture map. Read request unit 256 outputs the read request to texture cache 258. Read request unit 256 outputs horizontal and vertical alignment information, e.g., font filter footprint dimensions and position within the coarsely aligned region, to horizontal offset unit 262 and vertical offset unit 264, respectively. In some embodiments of the present invention, texture cache 258 is omitted and read request unit 256 outputs read requests to a memory resource, e.g., RAM, ROM, or the like. Texels read from the memory resource are received by texture cache 258. When texture cache 258 is omitted, coarsely aligned regions of texels are received by horizontal offset unit 262.

When a texel requested by read request unit 256 is not stored in texture cache 258, texture cache 258 outputs the read request to the memory resource and receives the coarsely aligned region from the memory resource. Texture cache 258 outputs the coarsely aligned region of the texture map that includes the requested texels to horizontal offset unit 262. Horizontal offset unit 262 horizontally aligns the coarsely aligned region to match the width of the font filter footprint to produce a horizontally aligned region of the texture map. Horizontal offset unit 262 outputs the horizontally aligned region to vertical offset unit 264. Vertical offset unit 264 vertically aligns the horizontally aligned region to match the height of the font filter footprint to produce a finely aligned region of the texture map. Vertical offset unit 264 outputs the finely aligned region to font filter unit 266 and bilinear filter unit 268.

Font filter unit 266 performs font filtering operations to produce coverage information indicating the percentage of texels within the font filter footprint that are covered by a character. In some embodiments of the present invention the finely aligned region output by vertical offset unit 264 is 9×9 bits and the bit aligned region specified by a copy instruction is 8×8 bits. Therefore, some bits, i.e. extra bits, of the finely aligned region are ignored by bilinear filter unit 268 to produce the bit aligned region specified by the copy instruction. In some embodiments of the present invention, the extra bits are not input to bilinear filter unit 268 and in other embodiments of the present invention, the extra bits are received and discarded by bilinear filter unit 268.

Bilinear filter unit 268 is configured to receive four texels and to bilinearly interpolate the four texels (a 2×2 texel region) based on a programmable filter mode to produce a single texel. When texture unit 253 is configured for conventional texture processing, the coarsely aligned region is read and passed unchanged from texture cache 258 to bilinear filter unit 268. Each texel processed by bilinear filter unit 268 may include one or more components and each component may range in size from 1 bit to 32 bits or larger. For example, coarsely aligned region 115 of 256 bits may include 4 texels, where each texel includes 4 components that are each 16 bits. When the "nearest" filter mode is used bilinear filter unit 268 outputs one of the four texels as the single bilinearly filtered texel, specifically the one texel that is closest to the position specified by the texture parameters.

Bilinear filter unit 268 is not used for font filtering operations. When bilinear filter unit 268 is configured to process texels for a copy instruction, it receives only one of the four texels that are ordinarily received because the texels outside of the font filter footprint have been discarded. Therefore, bilinear filter unit 268 is configured to filter the texels using "nearest" filter mode in order to discard three of the four texels, retaining only the one texel that is needed to execute the copy instruction. Bilinear filter unit 268 outputs the bit aligned region of the texture map and the bit aligned region is written by another unit to a location in a memory resource specified by the copy instruction. Therefore, the texture copy instruction is performed using a combination of processing units used for conventional texture processing and processing units used for font filtering.

Figure 2B:
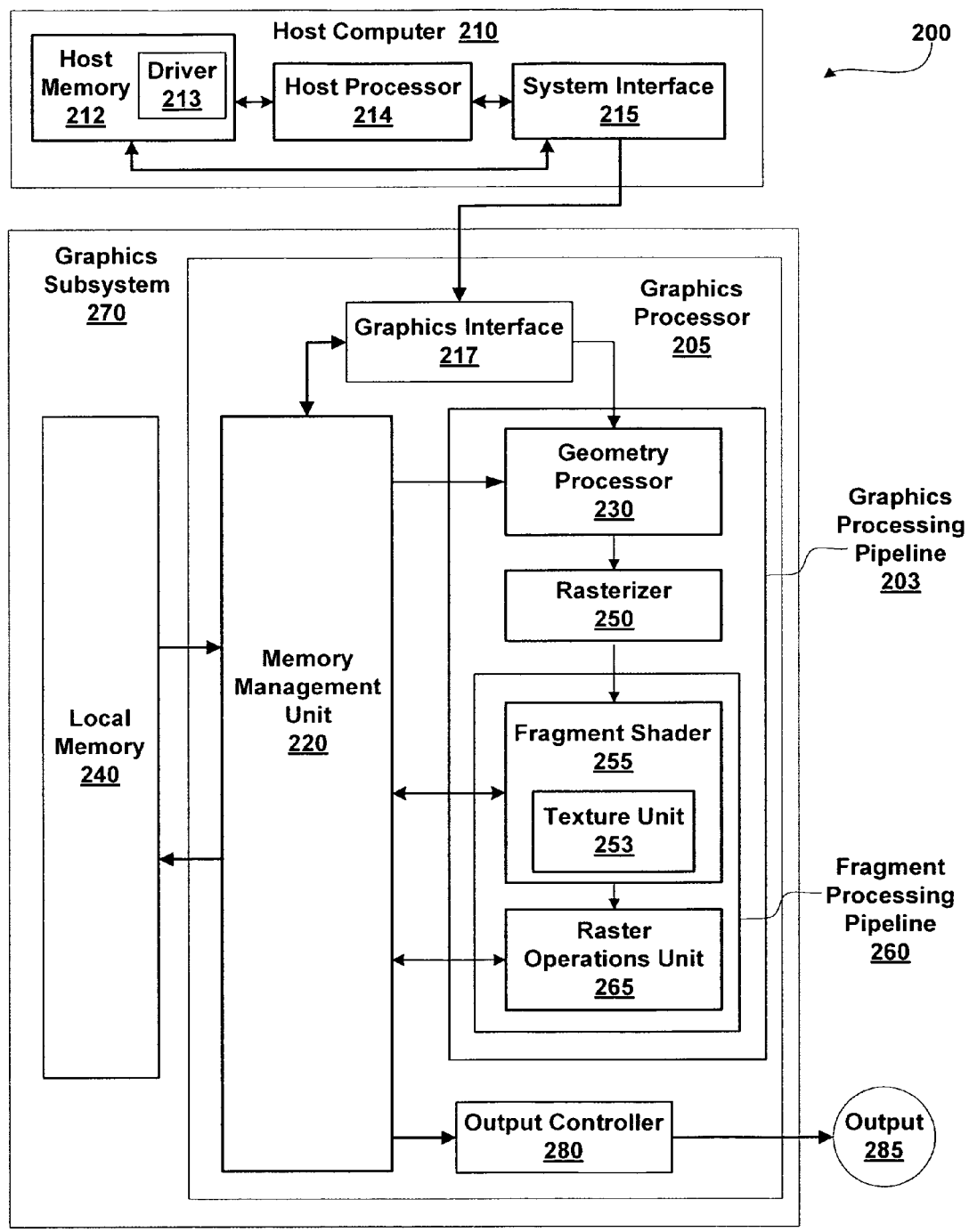
FIG. 2B is a block diagram of a graphics processing system including the texture unit of FIG. 2A in accordance with one or more aspects of the present invention.

FIG. 2B is a block diagram of an exemplary embodiment of a respective computer system, generally designated 200, and including a host computer 210, a graphics subsystem 207, and texture unit 253 of FIG. 2A in accordance with one or more aspects of the present invention. Computing system 200 may be a desktop computer, server, laptop computer, palm-sized computer, tablet computer, game console, portable wireless terminal such as a personal digital assistant or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

A graphics device driver, driver 213, interfaces between processes executed by host processor 214, such as application programs, and a programmable graphics processor 205, translating program instructions as needed for execution by programmable graphics processor 205. Driver 213 also uses commands to configure sub-units within programmable graphics processor 205. Specifically, driver 213 may specify the texture format and texture filtering mode for one or more texture maps.

Graphics subsystem 207 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory management unit 220 and an output controller 280. Data and program instructions received at interface 217 can be passed to a geometry processor 230 within graphics processing pipeline 203 or written to local memory 240 through memory management unit 220. In addition to communicating with local memory 240, and interface 217, memory management unit 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within geometry processor 230 and rasterizer 250. Shader programs are sequences of shader program instructions compiled by host processor 214 for execution within fragment processing pipeline 260. Geometry processor 230 receives a stream of program instructions (vertex program instructions and shader program instructions) and data from interface 217 or memory management unit 220, and performs vector floating-point operations or other processing operations using the data. The program instructions configure subunits within geometry processor 230, rasterizer 250 and fragment processing pipeline 260. The program instructions and data are stored in graphics memory, e.g., portions of host memory 212, local memory 240, or storage resources within programmable graphics processor 205. When a portion of host memory 212 is used to store program instructions and data the portion of host memory 212 can be uncached so as to increase performance of access by programmable graphics processor 205. Alternatively, configuration information is written to registers within geometry processor 230, rasterizer 250 and fragment processing pipeline 260 using program instructions, encoded with the data, or the like.

Data processed by geometry processor 230 and program instructions are passed from geometry processor 230 to a rasterizer 250. Rasterizer 250 is a sampling unit that processes primitives and generates sub-primitive data, such as fragment data, including parameters associated with fragments (texture identifiers, texture compression formats, texture coordinates, and the like). Rasterizer 250 converts the primitives into sub-primitive data by performing scan conversion on the data processed by geometry processor 230. Rasterizer 250 outputs fragment data and shader program instructions to fragment processing pipeline 260.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. Fragment shader 255 may include one or more texture unit 253. Texture map data may be applied to the fragment data using techniques known to those skilled in the art to produce shaded fragment data. When executing a copy instruction, fragment shader 255 outputs a bit aligned region as the fragment data.

Fragment shader 255 outputs the shaded fragment data, e.g., bitmap, color, and depth, and codewords generated from shader program instructions to raster operations unit 265. Raster operations unit 265 includes a read interface and a write interface to memory controller 220 through which raster operations unit 265 accesses data stored in local memory 240 or host memory 212. Raster operations unit 265 may perform near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory. For example, when a copy instruction is executed one or more bit aligned regions are written to the location specified by the copy instruction.

When processing is completed, an output 285 of graphics subsystem 207 is provided using output controller 280. Alternatively, host processor 214 reads the image stored in local memory 240 through memory management unit 220, interface 217 and system interface 215. Output controller 280 is optionally configured by opcodes to deliver data to a display device, network, electronic control system, other computing system 200, other graphics subsystem 207, or the like.

Figure 3A:
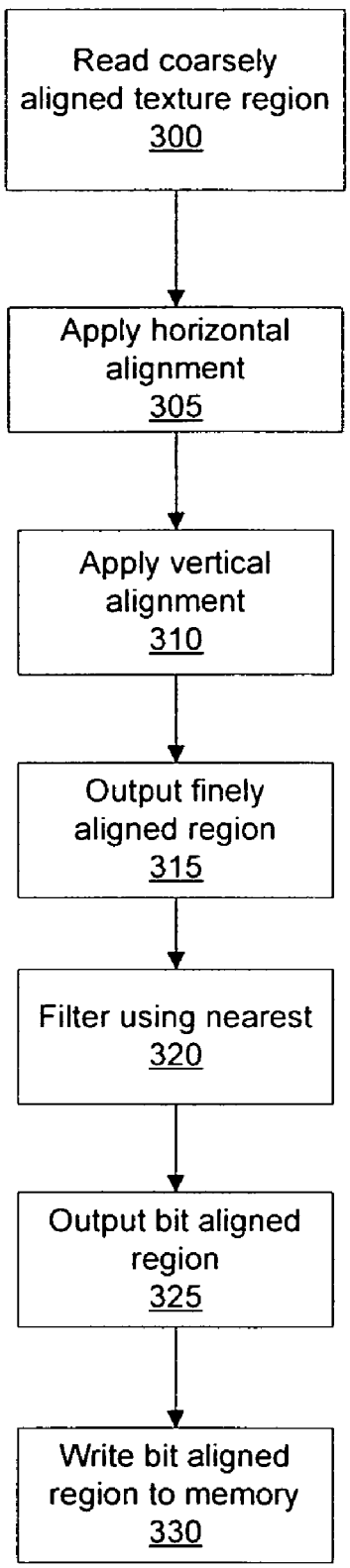
FIG. 3A illustrates a flow diagram of an exemplary method of using font filtering engines for texture copying in accordance with one or more aspects of the present invention.

FIG. 3A illustrates a flow diagram of an exemplary method of using font filtering engines for texture copying in accordance with one or more aspects of the present invention. In step 300 a read request is output by read request unit 256 or texture cache 258 to read a coarsely aligned region of a texture map. In step 305 the coarsely aligned region is aligned to match the width of a font filter footprint and texels that are outside of the width are discarded by horizontal offset unit 262 to produce a horizontally aligned region. In step 310 the horizontally aligned region is aligned to match the height of the font filter footprint and texels that are outside of the height are discarded vertical offset unit 264 to produce a finely aligned region.

In step 315 vertical offset unit 264 outputs the finely aligned region to bilinear filter unit 268. In some embodiments of the present invention, the finely aligned region is 9×9 1 bit texels, including an 8×8 region of the 1 bit texels that is specified by a texture copy instruction. In step 320 bilinear filter unit 268 filters the finely aligned region using "nearest" mode to select the 8×8 region. The 8×8 region is output as a bit aligned region to be written to a location in memory according to the texture copy instruction. In step 330 the bit aligned region is written to the location in memory by raster operations unit 265.

Figure 3B:
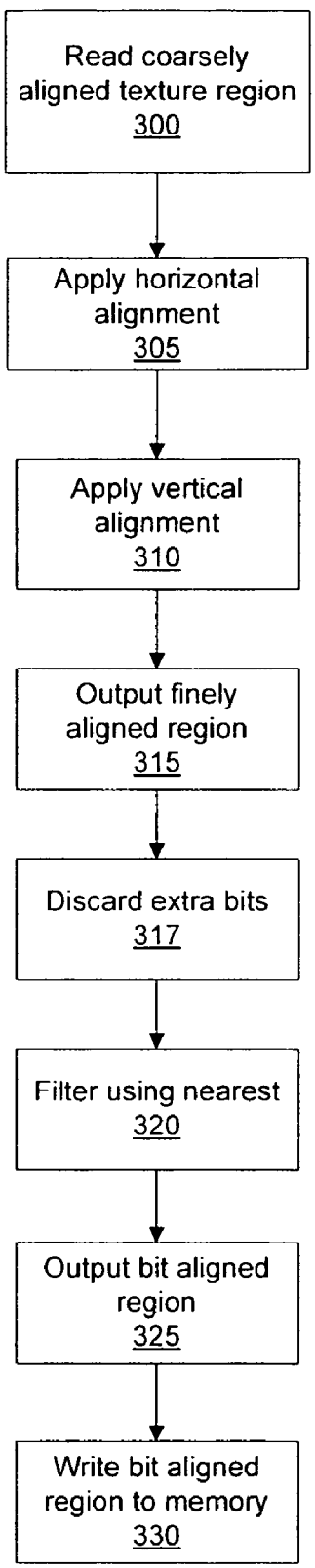
FIG. 3B illustrates a flow diagram of another exemplary method of using font filtering engines for texture copying in accordance with one or more aspects of the present invention.

FIG. 3B illustrates a flow diagram of another exemplary method of using font filtering engines for texture copying in accordance with one or more aspects of the present invention. FIG. 3B includes steps 300, 305, 310, 315, 320, 325, and 330 of FIG. 3A. Steps 300, 305, 310, and 315 are completed as previously described in conjunction with FIG. 3A. In step 317 the texels that are outside of the bit aligned region specified by the texture copy instruction are discarded by only routing the signals for the bit aligned region from vertical offset unit 264 to bilinear filter unit 268. In contrast, all of the texels within the font filter footprint are routed from vertical offset unit 264 to font filter unit 266. Steps 320; 325, and 330 are completed as previously described in conjunction with FIG. 3A.

Persons skilled in the art will appreciate that any system configured to perform the method steps of FIG. 3A or 3B, or their equivalents, is within the scope of the present invention. Texture copy instructions may be executed by systems used to perform font filtering operations. Texture data is read in coarsely aligned and font processing engines may be used to align the texture data as specified by the texture copy instruction to provide a finely aligned region of the texture data within a font filter footprint. The finely aligned region is then bilinearly filtered using a "nearest" mode to provide the bit aligned region of the texture map specified by the copy instruction. Execution of the copy instruction is accomplished using a combination of processing units used for conventional texture processing and processing units used for font filtering.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of copying a bit aligned region of a texture map, comprising:
   receiving a size associated with the bit aligned region of the texture map as specified by a texture copy instruction;
   reading a coarsely aligned region of the texture map that includes all texels within a font filter footprint that is used to extract specific texels from a character bitmap and filter the specific texels to produce a coverage value, the texture map storing the character bitmap in same sized blocks, each same sized block including a plurality of texels, wherein the coarsely aligned region includes an integer number of the same sized blocks;
   aligning the coarsely aligned region of the texture map in a first direction to match a width of the font filter footprint by discarding texels that are outside of the width of the font filter footprint to produce a first aligned region of the texture map;
   aligning the first aligned region of the texture map in a second direction to match a height of the font filter footprint by discarding texels that are outside of the height of the font filter footprint to produce a finely aligned region of the texture map;
   filtering the finely aligned region of the texture map using a bilinear interpolation engine configured in a nearest texel sampling mode to produce the bit aligned region of the texture map; and
   writing the bit aligned region of the texture map to a location in memory specified by the texture copy instruction to complete execution of the texture copy instruction.

2. The method of claim 1, wherein the width of the font filter footprint is different than the height of the font filter footprint.

3. The method of claim 1, wherein the coarsely aligned region of the texture map is aligned to an 8×8 texel boundary.

4. The method of claim 3, wherein the coarsely aligned region of the texture map is 16×16 texels.

5. The method of claim 1, further comprising discarding entire texels that are outside of the bit aligned region specified by the texture copy instruction when the finely aligned region of the texture map is larger than the bit aligned region of the texture map.

6. The method of claim 1, wherein the finely aligned region of the texture map is 9×9 texels and the bit aligned region of the texture map is 8×8 texels.

7. The method of claim 1, wherein the first direction is a horizontal direction and the second direction is a vertical direction.

8. The method of claim 1, further comprising determining the coverage value for a character represented by the texture map that indicates a percentage of texels within the font filter footprint that are also within a character represented by the character bitmap.

9. The method of claim 1, wherein the texels that are outside of the height of the font filter footprint are discarded by routing only signals corresponding to the finely aligned region of the texture map to the bilinear interpolation engine.

10. A system for copying a bit aligned region of a texture map, comprising:
   texture read request unit configured to receive a size associated with the bit aligned region of the texture map as specified by a texture copy instruction, read a coarsely aligned region of the texture map that includes all texels within a font filter footprint that is used to extract specific texels from a character bitmap, and filter the specific texels to produce a coverage value, the texture map storing the character bitmap in same sized blocks, each same sized block including a plurality of texels, wherein the coarsely aligned region includes an integer number of the same sized blocks;
   a first font processing engine configured to align the coarsely aligned region of the texture map in a first direction to match a width of a font filter footprint and produce a first aligned region of the texture map without scaling or resizing the coarsely aligned region of the texture map;
   a second font processing engine configured to align the first aligned region of the texture map in a second direction to match a height of the font filter footprint and produce a finely aligned region of the texture map without scaling or resizing the first aligned region of the texture map; and
   a bilinear interpolation engine configured to filter the finely aligned region of the texture map using a nearest texel sampling mode to produce the bit aligned region of the texture map; and
   a write interface configured to write the bit aligned region of the texture map to a location in memory specified by the texture copy instruction to complete execution of the texture copy instruction.

11. The system of claim 10, wherein the width of the font filter footprint is different than the height of the font filter footprint.

12. The system of claim 10, wherein the coarsely aligned region of the texture map is aligned to an 8×8 texel boundary.

13. The system of claim 12, wherein the coarsely aligned region of the texture map is 16×16 texels.

14. The system of claim 10, wherein the bilinear interpolation engine is further configured to discard entire texels that are outside of the bit aligned region of the texture map when the finely aligned region of the texture map is larger than the bit aligned region of the texture map.

15. The system of claim 10, wherein the finely aligned region of the texture map is 9×9 texels and the bit aligned region of the texture map is 8×8 texels.

16. The system of claim 10, wherein the texture map represents a one bit texture.

17. The system of claim 10, further comprising a texture cache coupled to the read request unit and configured to store coarsely aligned regions of the texture map.

18. The system of claim 10, further comprising a font filter unit coupled to the second font processing engine and configured to determine the coverage value for a character represented by the texture map that indicates a percentage of texels within the font filter footprint that are also within a character represented by the character bitmap.

19. The system of claim 10, wherein the first direction is a horizontal direction and the second direction is a vertical direction.

20. The system of claim 10, wherein the texels that are outside of the height of the font filter footprint to are discarded by routing only signals corresponding to the finely aligned region of the texture map from the second font processing engine to the bilinear interpolation engine.

* * * * *